United States Patent
Chedeau et al.

(10) Patent No.: US 9,569,501 B2
(45) Date of Patent: Feb. 14, 2017

(54) OPTIMIZING ELECTRONIC LAYOUTS FOR MEDIA CONTENT

(71) Applicant: Facebook, Inc., Menlo Park, CA (US)

(72) Inventors: Christopher Serge Benjamin Chedeau, Redwood City, CA (US); Adrien Thomas Friggeri, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 790 days.

(21) Appl. No.: 13/941,089

(22) Filed: Jul. 12, 2013

(65) Prior Publication Data
US 2015/0019545 A1 Jan. 15, 2015

(51) Int. Cl.
G06F 17/00 (2006.01)
G06F 17/30 (2006.01)
G06F 17/21 (2006.01)
G06Q 50/00 (2012.01)
G06Q 30/02 (2012.01)

(52) U.S. Cl.
CPC ......... *G06F 17/3053* (2013.01); *G06F 17/211* (2013.01); *G06F 17/212* (2013.01); *G06Q 50/01* (2013.01); *G06Q 30/02* (2013.01)

(58) Field of Classification Search
CPC ............................ G06F 17/211; G06F 17/212
See application file for complete search history.

(56) References Cited

U.S. PATENT DOCUMENTS

| | | | |
|---|---|---|---|
| 9,195,640 B1 * | 11/2015 | Donneau-Golencer | G06F 17/28 |
| 2001/0051962 A1 * | 12/2001 | Plotkin | G06F 17/243 |
| | | | 715/229 |
| 2004/0187079 A1 * | 9/2004 | Yamada | G06F 17/211 |
| | | | 715/246 |
| 2005/0055635 A1 * | 3/2005 | Bargeron | G06F 17/248 |
| | | | 715/251 |
| 2005/0102617 A1 * | 5/2005 | Nagahara | G06F 17/211 |
| | | | 715/249 |

(Continued)

FOREIGN PATENT DOCUMENTS

KR 10-2010-0110211 A 10/2010

OTHER PUBLICATIONS

Atkins, Brian C.; "Blocked Recursive Image Composition," Hewlett-Packard Laboratories, pp. 821-824.

(Continued)

*Primary Examiner* — Laurie Ries
(74) *Attorney, Agent, or Firm* — Baker Botts L.L.P.

(57) ABSTRACT

In one embodiment, a method includes accessing N electronic media-content items and a plurality of media-content templates, where each of the media-content templates includes a pre-determined number of surface areas for a pre-determined number of media-content items. The method includes scoring, based on one or more features, for each of one or more of the media-content templates, the placement of X of the electronic media-content items in the media-content template, where X equals the lesser of N and the pre-determined number of surface areas of the media-content template. The method includes selecting one of the media-content templates with a highest score and providing the X electronic media-content items in the selected media-content template for display to a user.

20 Claims, 4 Drawing Sheets

(56) References Cited

U.S. PATENT DOCUMENTS

| | | | |
|---|---|---|---|
| 2009/0034849 A1* | 2/2009 | Grosvenor | G06T 3/0012 382/199 |
| 2009/0049370 A1* | 2/2009 | Faris | G06F 17/30905 715/200 |
| 2009/0164887 A1* | 6/2009 | Ikegami | G06F 17/30905 715/247 |
| 2009/0254813 A1* | 10/2009 | Kobayashi | G06T 11/60 715/243 |
| 2009/0292986 A1* | 11/2009 | Anderson | G06T 11/60 715/243 |
| 2010/0119160 A1* | 5/2010 | Sibiryakov | G06K 9/6212 382/209 |
| 2010/0180213 A1* | 7/2010 | Karageorgos | G06F 17/30011 715/753 |
| 2010/0299603 A1* | 11/2010 | Farkas | G06F 17/30038 715/733 |
| 2010/0306249 A1* | 12/2010 | Hill | G06F 17/30867 707/769 |
| 2011/0029914 A1* | 2/2011 | Whitby | G06T 11/60 715/781 |
| 2011/0060994 A1* | 3/2011 | Maxwell | G06F 3/147 715/730 |
| 2011/0066636 A1* | 3/2011 | Guido | G06F 17/241 707/769 |
| 2011/0131226 A1* | 6/2011 | Chandra | G06F 17/30569 707/759 |
| 2011/0157215 A1* | 6/2011 | Aoyagi | G06F 3/147 345/593 |
| 2011/0214050 A1* | 9/2011 | Stambaugh | G06F 3/04817 715/234 |
| 2011/0289419 A1* | 11/2011 | Yu | G06F 9/44526 715/738 |
| 2012/0117473 A1* | 5/2012 | Han | G11B 27/034 715/723 |
| 2012/0159314 A1* | 6/2012 | Schrier | G06F 17/30905 715/252 |
| 2013/0024757 A1* | 1/2013 | Doll | G06Q 50/01 715/204 |
| 2013/0031470 A1* | 1/2013 | Daly, Jr. | G06F 17/30893 715/243 |
| 2013/0097477 A1* | 4/2013 | Adolf | G06F 17/30905 715/205 |
| 2013/0124968 A1* | 5/2013 | Dontcheva | G06F 17/212 715/234 |
| 2013/0212471 A1* | 8/2013 | Damera-Venkata | G06F 17/211 715/243 |
| 2014/0258849 A1* | 9/2014 | Chung | G06F 17/212 715/243 |
| 2014/0281851 A1* | 9/2014 | McHale | F41G 1/38 715/202 |
| 2014/0281869 A1* | 9/2014 | Yob | G06F 17/245 715/217 |
| 2014/0282029 A1* | 9/2014 | Vishria | H04L 29/0809 715/738 |
| 2014/0368511 A1* | 12/2014 | Baumgartner | G06T 13/00 345/473 |

OTHER PUBLICATIONS

International Search Report and Written Opinion for International Application PCT/US2014/046088, Nov. 3, 2014.

* cited by examiner

OPTIMIZING ELECTRONIC LAYOUTS FOR MEDIA CONTENT

TECHNICAL FIELD

This disclosure generally relates to displaying electronic media content.

BACKGROUND

Electronic media content includes images (e.g., electronic photos), advertisements, a combination of text and non-text graphics, drawings, graphical renderings, videos etc. Media content may be stored in and accessed from any suitable memory, such as memory in a local device, mobile device, or remote device (such as a server, etc). Media content may be displayed in a layout that specifies the location, size, boundaries, borders and border size, etc. of the media content and of the layout as a whole. Layouts may be automatically generated or may be user generated, such as when a developer manually specifies the location, size, etc. of the media content to be displayed.

SUMMARY OF PARTICULAR EMBODIMENTS

Determining an aesthetically-pleasing and otherwise meaningful layout for media content includes accessing a set of media content, accessing a set of pre-determined templates for the media content, and scoring at least some of the media content in each of at least two of the templates according to one or more features. Features may include the size of media content, the number of media content in a layout template, the content of media content, user preferences, the context in which the media content are displayed, etc. The template and group of media content that receives that highest score according to the relevant features is selected for presentation to a user.

DESCRIPTION OF EXAMPLE EMBODIMENTS

Figure 1:
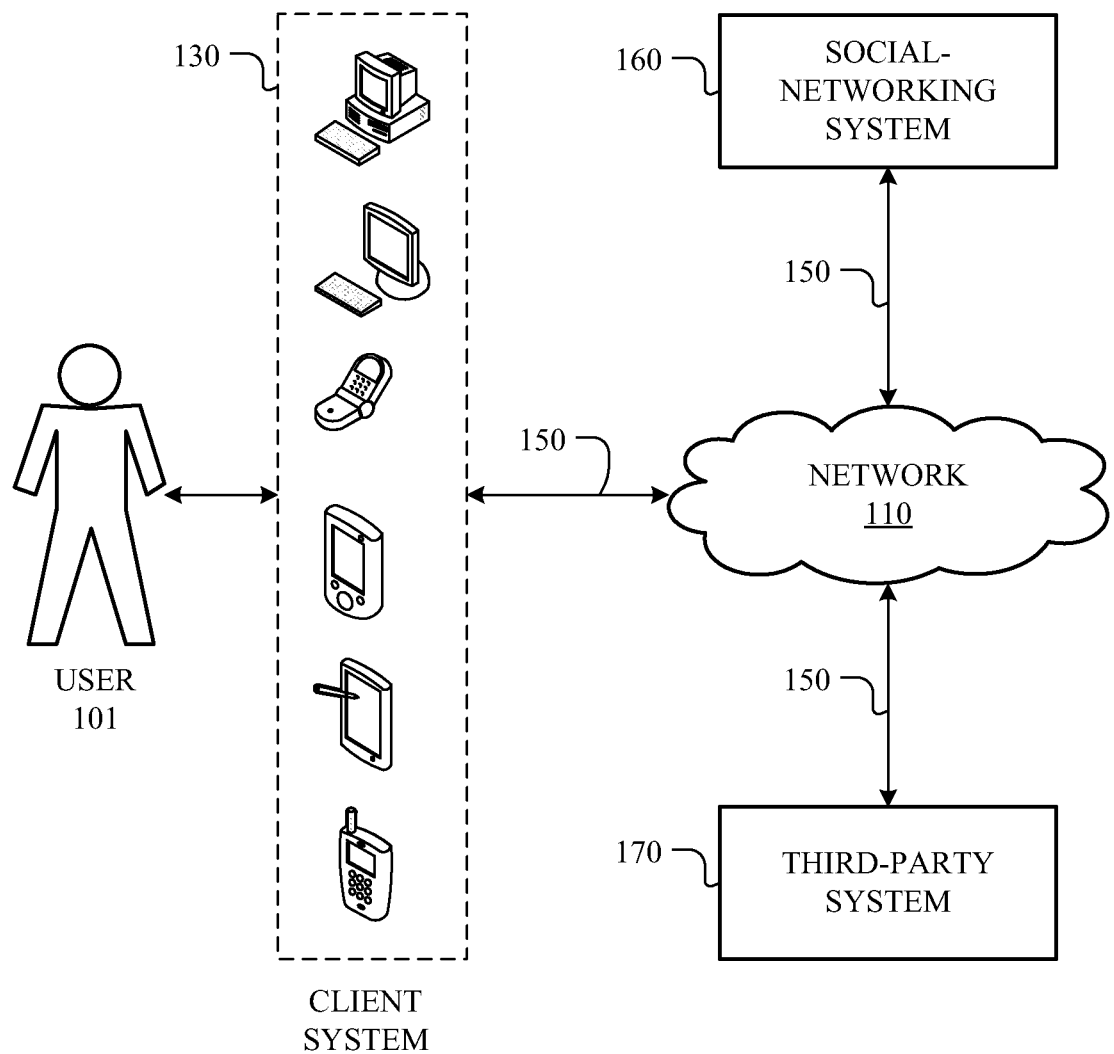
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host a third-party system. Third-party system 170 may generate, store, receive, and send third-party system data. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, social-networking system 160 may store one or more social graphs in one or more data stores. In particular embodiments, a social graph may include multiple nodes—which may include multiple user nodes or multiple concept nodes—and multiple edges connecting the nodes. In particular embodiments, a social-networking system 160, client system 130, or third-party system 170 may access a social graph and related social-graph information for suitable applications. The nodes and edges of a social graph may be stored as data objects, for example, in a data store (such as a social-graph database). Such a data store may include one or more searchable or queryable indexes of nodes or edges of the social graph.

In particular embodiments, a user node may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, a concept node may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. In particular embodiments, a node in a social graph may represent or be represented by a webpage (which may be referred to as a "profile page"). Profile pages may be hosted by or accessible to social-networking system 160. Profile pages may also be hosted on third-party websites associated with a third-party server 170. Although this disclosure provides particular examples of nodes in a social graph, this disclosure contemplates any suitable nodes in a social graph.

In particular embodiments, a pair of nodes in a social graph may be connected to each other by one or more edges. An edge connecting a pair of nodes may represent a relationship between the pair of nodes. In particular embodiments, an edge may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge connecting the first user's user node to the second user's user node in the social graph and store the edge as social-graph information in one or more of data stores 164. In particular embodiments, an edge between a user node and a concept node may represent a particular action or activity performed by a user associated with the user node toward a concept associated with a concept node. As an example and not by way of limitation, a user may "like," "attended," "played," "listened," "cooked," "worked at," or "watched" a concept, each of which may correspond to a edge type or subtype. As another example, a user viewing a concept-profile page (such as, for example, by using a web browser or a special-purpose application hosted by the user's client system 130) may indicate that he or she likes the concept represented by the concept node by clicking or selecting a "Like" icon, which may cause the user's client system 130 to send to social-networking system 160 a message indicating the user's liking of the concept associated with the concept-profile page. Although this disclosure describes forming particular edges in particular manners, this disclosure contemplates forming any suitable edges in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user.

In particular embodiments, social-networking system 160 may calculate a coefficient based on a user's actions, such as viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content, such as users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. In particular embodiments, social-networking system 160 may calculate a coefficient based on location information. In particular embodiments, social-networking system 160 may perform particular actions with respect to a user based on coefficient information. Coefficients may be used to predict whether a user will perform a particular action based on the user's interest in the action. In particular embodiments, social-networking system 160 may calculate a coefficient in response to a request for a coefficient from a particular system or process. In particular embodiments, a coefficient may be calculated using information stored in or associated with a social network and/or a social graph.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Electronic media content includes such as electronic photos, advertisements, a combination of text and non-text graphics, drawings, graphical renderings, graphical or text-based search results, or any other suitable type of media content. Media content may be stored in and accessed from any suitable memory, such as memory in a local device, mobile device, or remote device (such as a server, etc). Media content may be displayed in a layout that specifies the location, size, boundaries, borders and border size, etc. of the media content and of the layout as a whole. In particular embodiments, layouts may be predetermined templates for media content. Media content templates may be automatically generated or may be user generated.

Figure 2:
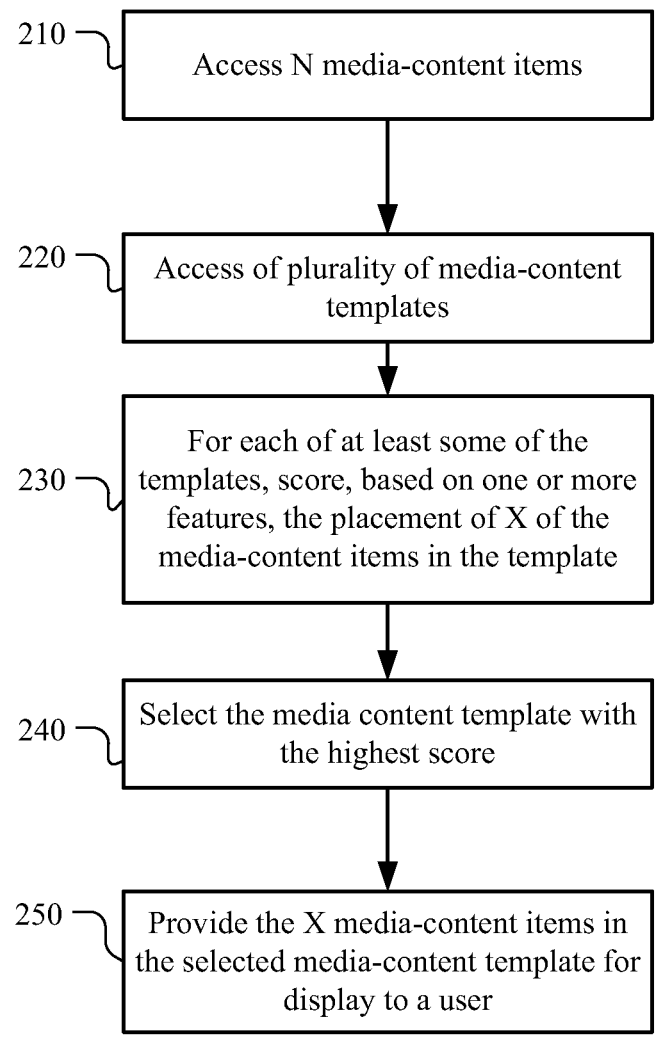
FIG. 2 illustrates an example method for selecting a media-content template as the layout for one or more electronic media content.

FIG. 2 illustrates an example method 200 for selecting a media content template as the layout for media content. The method may be performed by any of one or more suitable computing devices, such as servers, client device, and/or mobile devices. The method may begin at step 210, where N media-content items are accessed. In particular embodiments, at least some of the N media-content items may be accessed by receiving the electronic media content at a computing device. In particular embodiments, at least some of the media content may be accessed from memory on the computing device or an another computing devices. In particular embodiments, N is a fixed number (e.g., 10 media-content items at a time may be accessed). In particular embodiments, N may be a variable number that depends on, for example, the application for which or context in which the media content is being accessed, user preferences, the media content that is being accessed (e.g. whether they are images, videos, user photos, advertisements, etc), the number of media-content items that are available to be accessed, or any other suitable attribute.

Figure 3:
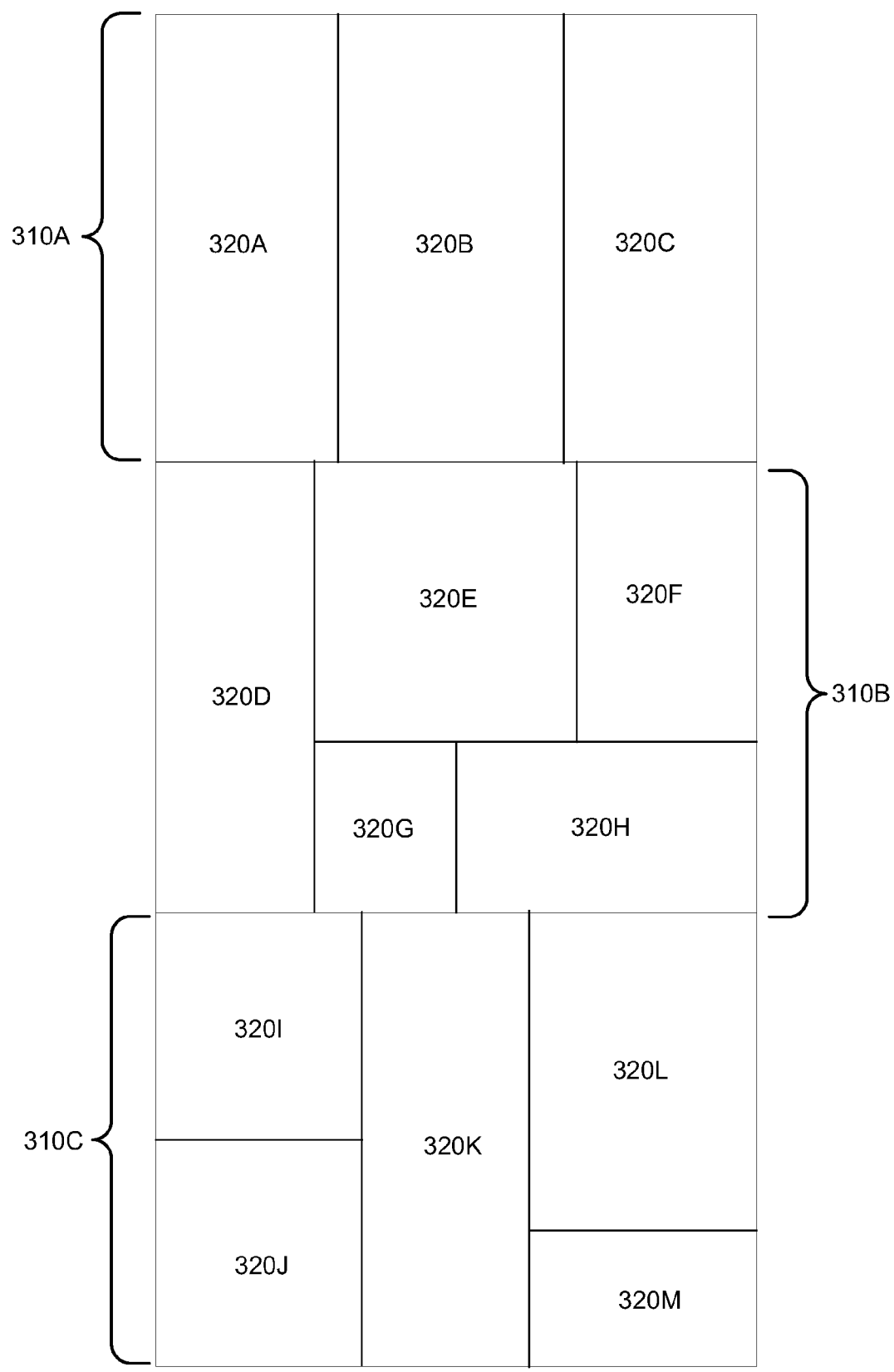
FIG. 3 illustrates example media-content templates.

At step 220, two or more media content templates are accessed. Each of the media content templates (e.g. templates 310A-C in FIG. 3) has one or more spaces (i.e., surface areas, as illustrated by spaces 320A-M in FIG. 3) for media-content items, with each space capable of being occupied by one of the media-content items. The templates may be accessed from any of one or more suitable computing devices. In particular embodiments, all available templates may be accessed. In particular embodiments, only a subset of the available templates may be accessed. For example, templates may be pre-screened (e.g. based on the type of media content to be presented, the number of media-content items accessed or to be presented, the application for or context in which the media content is to be presented, etc.) or only a select number of templates may be accessed (e.g. a limit such as 10 templates, templates until a desirable template is reached, etc). In particular embodiments, media content templates, when presented, may have the same size in one or more dimensions. For example, each template 310 in FIG. 3 is a rectangular block with a fixed horizontal and vertical size. Templates may take any suitable shapes and be of any suitable size. While this disclosure provides specific examples of template size and shapes, this disclosure contemplates any suitable media content template size and/or shape.

At step 230, a combination of X of the N accessed media-content items and at least one of the accessed of the templates is scored. In other words, X media-content items are treated is if they have been placed in an media content template, and the combination of the media-content items and template is assigned a score according to one or more scoring features. In particular embodiments, X is a variable that may vary for each template based on the number of available media-content items and/or the number of instances media content spaces in the template. For example, X may be the lesser of the number of media-content items spaces in the template being scored or the number N of media-content items accessed in step 210 (the embodiments described in this disclosure contemplate that X equals both if N equals the number of media-content items spaces in the template being scored). In particular embodiments, additional media-content items may be accessed (if available) if N is less than the number of media content spaces in a template being scored. In particular embodiments, X may be a predetermined number that is the same for each media content template being scored (i.e., a template is only considered if its media content spaces equal X).

Features used to score a template and corresponding set of media-content items may be of any suitable type. For example, a template that accommodates desired aspect ratios with as little cropping as possible may result in a relatively higher score. For example, if a media-content item (e.g., an image, video, etc.) has a 16:9 aspect ratio, then that aspect ratio should be preserved, regardless of the media-content item's size. In particular embodiments, a feature may be a size or area of one or more media-content items. For example, a template that holds taller media-content items or larger media-content items (with aspect ratio's preserved, etc) may receive a relatively higher score. As an example, a wide, panoramic image may be more desirable than a square image, for example based on the context of the photos (e.g. wider shots for photographs of nature). In particular embodiments, a feature may be a number of media-content items. For example, a template that holds more media-content items may receive a relatively higher score than a template that holds fewer. In particular embodiments, a feature may be a variance between or among media content spaces in a template. For example, less variance among the size of media content spaces may receive a relatively higher score. In particular embodiments, a feature may be a variety between media content templates, i.e. that more variety (in placement of media-content items, size of that media content, overall layout appearance, types of media content, content of the media-content items, etc.) may be more highly scored. For example, media content templates 310 in FIG. 3 each has a different layout, and a media content template that continues that trend may be given a relatively higher score. As another example, visual artifacts such as horizontal patterns in a media content template or across media content templates may be disfavored. For example, in templates 310 in FIG. 3 are arranged such that they avoid horizontal patterns e.g. due to media-content items being placed at regular intervals and sized equally. In particular embodiments, a feature may be an order or sequence of media-content items placed in one or more media content templates, either within a template, among templates, or both. A template or templates that maintain the order of the media-content items may receive a relatively higher score. For example, media content such as images may have an order associated with them, such as chronological order based on the content in the image at a time the image was uploaded to a server or service, a time that the images were taken, the order in which the images were accessed or received in step 210 (which may correspond to e.g., the chronological order of the images), etc. Ordering may be of any suitable kind, such as from new to old, old to new, etc. In particular embodiments, a feature may be variety of media content or in instances of a type of media content presented. For example, contrast in colors, shapes, locations, etc. of images or videos may be emphasized, while variety of products in ads may be deemphasized when a user has searched for a particular product. In particular embodiments, a feature may be one or more user preferences regarding a template or specific media content. For example, a user may specify preferences generally (e.g. larger instances media content are better, media content containing or relating to connections in a social network are better, media-content items with cats in them are better, media content that has bright colors are better, specific types of media content is better, etc), or may specify preferences for particular media-content items (e.g. that certain media-content items or groups of media-content items be displayed together, that particular media-content items be displayed in a particular template, that particular instances media content be displayed in particular order, etc.). In particular embodiments, a feature may be the context in which a template is to be displayed. For example, simpler templates may score highly for photos that display a set of users' icons in a chat program, while more complex (e.g. more variety in sizes, shapes, content, etc) may be preferred for large photos albums. As another example, photos that are people-centric (e.g. a photo focused on faces, etc) may be disfavored when a user has searched for photos of places. In other words, a photo of a tourist in front of the Eiffel tower may receive a relatively lower score than a photo of just the Eiffel tower when a user has searched for photos of the Eiffel tower. While this disclosure describes specific examples of the features that may be used to score a set of media-content items in a template, this disclosure contemplates any suitable features being used to score a set of media-content items in a template.

In particular embodiments, a feature may be the importance of one or more instances of media content or attributes of media-content items. For example, a template that can display a higher number of important media-content items may receive a relatively higher score. Likewise, in particular embodiments a template that displays important media-content items in particular positions (e.g. centered in the template, etc.), displays those media-content items in relatively larger media content spaces, or otherwise emphasizes those media-content items may be receive relatively higher scores. Importance of a media-content item may be determined by any suitable method, and may include any of: the importance of the media-content item to the provider of the media-content item or of the type of media content, the application or context in which the media-content item is to be displayed, the importance to the user viewing the media-content items, etc. In particular embodiments, the importance of a media-content item may be determined based on based on explicit feedback from the entity or the user the importance is measured relative to. For example, importance to a user may be determined based on explicit feedback from the user regarding what media-content items are important to that user or what aspects of those media-content items generally are important to that user. In particular embodiments, importance to a user or entity may be determined from information associated with a social network, such as from data associated with a social graph corresponding to that social network. In particular embodiments, that information may be explicit preferences of the user or entity (such as particular media-content items that are important or particular aspects or features of media-content items that are important) or may be determined from implicit information regarding that user or entity, or from other users or entities having similar characteristics as the relevant user or entity.

Any of the methods described above for determining information from a social graph, a social network, and/or using coefficient or affinity may be used to determine an importance of a media-content item or attributes of a media-content item to a user or entity. In addition, this disclosure contemplates any suitable method for determining the importance of a media-content item or of media content attributes to a user or entity.

Scoring the X media-content items placed in a media content template may be performed by any suitable method. For example, a score may be assigned to each feature, and a total score may be obtained by adding together the feature scores. This disclosure contemplates any suitable scoring algorithm or set of rules. In particular embodiments, feature scores (or total scores) may be weighted, e.g. by context, user preferences, past indications of users' likes or dislikes, etc. In particular embodiments, scores may be normalized, such that each score is represented on a particular scale (e.g. continuously from 0 to 1). In particular embodiments, scoring a template may include adjusting the size of one or more media-content items spaces (which may include adjusting the size of a media content-space border, borders thicknesses of the template, etc.), where appropriate. For example, media content spaces in a particular layout may be re-sized to maximize the score for the set of photos being scored for that template, for example to preserve aspect ratios, emphasize important media-content items, increase or decrease variance in presentation, etc. As one example, the methods for recursively determining appropriate image sizes for a given layout while maintaining aspect ratio described in "Blocked Recursive Image Composition" by C. Brian Atkins may be used while scoring a template and set of images. As described in some of the above examples of features, in particular embodiments, scoring of a template may depend on the score and/or attributes of other templates that are displayed around or near the template. While this disclosure provides examples of specific ways of scoring X media-content items in a template, this disclosure contemplates any suitable method of scoring the media-content items in a template.

At step 240, the template with the highest score is selected. In particular embodiments, scoring of templates may continue until a template is given a score that is higher than a threshold score, in which case the template may be selected. In particular embodiments, a subset of accessed templates or all accessed templates may be scored, and the highest-scoring template selected after all templates have been scored.

At step 250, the X media-content items are provided for display in the selected media content template. In particular embodiments, processing such as scaling, ensuring proper display resolution, etc. may occur before the media-content items are provided for display, or after the media-content items are provided for display but before the media-content items are displayed. In particular embodiments, the media-content items and template may be provided for display on an electronic display. In particular embodiments, the media-content items and template may be provided for display on a non-electronic display, such as for example media that can be printed on (e.g. paper, posterboard, etc.), media that can be projected on, or any other suitable media. In particular embodiments, the method of FIG. 2 may be repeated, and at least some the media-content items and templates selected as a result of the method may be displayed together on a display.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 4:
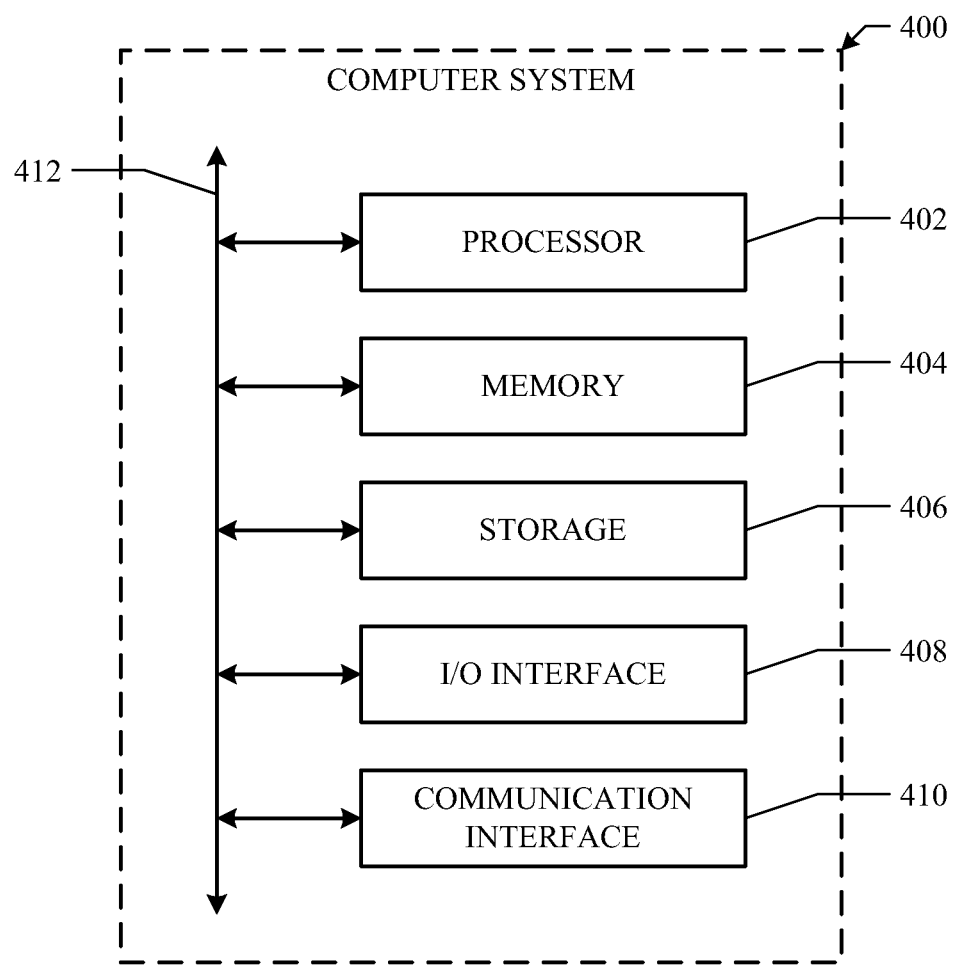
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, accessing N electronic media-content items;
by one or more computing devices, accessing a plurality of media-content templates, wherein each of the media-content templates comprises a pre-determined number of surface areas for a pre-determined number of media-content items;
by one or more computing devices, scoring, based on one or more features, for each of one or more of the media-content templates, the placement of X of the electronic media-content items in the media-content template, wherein X equals the lesser of N and the pre-determined number of surface areas of the media-content template, wherein the features comprise one or more of:
a variance between the areas of two or more of the surface areas of the media-content template being scored;
a difference between the media-content template being scored and one or more other media-content templates to be displayed near the media-content template being scored:
the order that the X electronic media-content items were accessed; or
an importance of at least one of the instances of media content to the user or to the provider of the media-content item;
by one or more computing devices, selecting the media-content template with the highest score; and
by one or more computing devices, providing the X electronic media-content items in the selected media-content template for display to a user.

2. The method of claim 1, wherein the X electronic media-content items comprise the first X electronic media-content items accessed from the N electronic media-content items.

3. The method of claim 2, wherein the N electronic media-content items are arranged in a chronological order.

4. The method of claim 1, wherein the one or more features comprise one or more of:
an aspect ratio of one of the X electronic media-content items;
a size of one of the X electronic media-content items;
the number of surface areas of the media-content template being scored;
a variance between the areas of two or more of the surface areas of the media-content template being scored;
a difference between the media-content template being scored and one or more other media-content templates to be displayed near the media-content template being scored;
the order that the X electronic media-content items were accessed; or
content represented by at least one of the X electronic media-content items.

5. The method of claim 1, wherein a feature is an attribute of at least one of the X media-content items, the attribute comprising one or more of:

a color;

a shape; or a presence of a human feature.

6. The method of claim 1, wherein a feature is an importance of at least one of the instances of media content to the user or the provider of the media-content item.

7. The method of claim 6, wherein the importance is determined at least in part based on information associated with a social-networking system, the social-networking system comprising a graph that comprises a plurality of nodes and edges connecting the nodes, at least one node in the graph corresponding to the user or the provider of the media content.

8. The method of claim 7, wherein the importance is determined based at least in part on one or more of:

a coefficient determination made from information associated with the social-networking system; or an affinity determination made from information associated with the social-networking system.

9. The method of claim 1, wherein at least one of the features comprises a context that the media-content template is to be displayed in.

10. The method of claim 1, wherein scoring comprises adjusting, based on one or more of the features, the area of one of the surface areas relative to at least one of the other surface areas.

11. The method of claim 1, wherein the scoring is defined at least in part by input from the user.

12. The method of claim 1, wherein at least one of the surfaces areas of at least one of the media-content templates is predetermined for one of the electronic media-content items based on an attribute of that electronic media-content item.

13. The method of claim 12, wherein the attribute comprises one of more of:

an importance of the electronic media-content item to the user;

the order in which the electronic media-content item is accessed; or a time associated with the electronic media-content item or with an event represented by the electronic media-content item.

14. One or more computer-readable non-transitory storage media embodying software that is operable when executed to:

access N electronic media-content items;

access a plurality of media-content templates, wherein each of the media-content templates comprises a pre-determined number of surface areas for a pre-determined number of media-content items;

score, based on one or more features, for each of one or more of the media-content templates, the placement of X of the electronic media-content items in the media-content template, wherein X equals the lesser of N and the pre-determined number of surface areas of the media-content template, wherein the features comprise one or more of:

a variance between the areas of two or more of the surface areas of the media-content template being scored;

a difference between the media-content template being scored and one or more other media-content templates to be displayed near the media-content template being scored:

the order that the X electronic media-content items were accessed; or an importance of at least one of the instances of media content to the user or to the provider of the media-content item;

select the media-content template with the highest score; and provide the X electronic media-content items in the selected media-content template for display to a user.

15. A system comprising:

one or more processors; and a memory coupled to the processors comprising instructions executable by the processors, the processors being operable when executing the instructions to:

access N electronic media-content items;

access a plurality of media-content templates, wherein each of the media-content templates comprises a pre-determined number of surface areas for a pre-determined number of media-content items;

score, based on one or more features, for each of one or more of the media-content templates, the placement of X of the electronic media-content items in the media-content template, wherein X equals the lesser of N and the pre-determined number of surface areas of the media-content template, wherein the features comprise one or more of:

a variance between the areas of two or more of the surface areas of the media-content template being scored;

a difference between the media-content template being scored and one or more other media-content templates to be displayed near the media-content template being scored:

the order that the X electronic media-content items were accessed; or an importance of at least one of the instances of media content to the user or to the provider of the media-content item;

select the media-content template with the highest score; and provide the X electronic media-content items in the selected media-content template for display to a user.

16. The media of claim 14, wherein:

a feature is an importance of at least one of the instances of media content to the user or the provider of the media-content item; and the importance is determined at least in part based on information associated with a social-networking system, the social-networking system comprising a graph that comprises a plurality of nodes and edges connecting the nodes, at least one node in the graph corresponding to the user or the provider of the media content.

17. The media of claim 16, wherein the importance is determined based at least in part on one or more of:

a coefficient determination made from information associated with the social-networking system; or an affinity determination made from information associated with the social-networking system.

18. The media of claim 14, wherein at least one of the features comprises a context that the media-content template is to be displayed in.

19. The apparatus of claim 15, wherein:

a feature is an importance of at least one of the instances of media content to the user or the provider of the media-content item; and the importance is determined at least in part based on information associated with a social-networking system, the social-networking system comprising a graph that comprises a plurality of nodes and edges connecting the nodes, at least one node in the graph corresponding to the user or the provider of the media content.

20. The apparatus of claim 15, wherein at least one of the features comprises a context that the media-content template is to be displayed in.

\* \* \* \* \*